(12) United States Patent
Zhou et al.

(10) Patent No.: US 10,867,089 B2
(45) Date of Patent: Dec. 15, 2020

(54) ELECTRICAL SYSTEM LEVEL (ESL) BATTERY DISCHARGE SIMULATION

(71) Applicant: Taiwan Semiconductor Manufacturing Co., Ltd., Hsinchu (TW)

(72) Inventors: Charlie Zhou, Fremont, CA (US); Kai-Yuan Ting, San Jose, CA (US); Sandeep Kumar Goel, Dublin, CA (US); Tze-Chiang Huang, Sartoga, CA (US); Yun-Han Lee, Hsinchu County (TW)

(73) Assignee: Taiwan Semiconductor Manufacturing Co., Ltd. (TW)

(*) Notice: Subject to any disclaimer, the term of this patent is extended or adjusted under 35 U.S.C. 154(b) by 738 days.

(21) Appl. No.: 15/654,394

(22) Filed: Jul. 19, 2017

(65) Prior Publication Data
US 2018/0314772 A1 Nov. 1, 2018

Related U.S. Application Data

(60) Provisional application No. 62/491,540, filed on Apr. 28, 2017.

(51) Int. Cl.
*G06F 30/33* (2020.01)
*G06F 30/367* (2020.01)
(Continued)

(52) U.S. Cl.
CPC ............ *G06F 30/327* (2020.01); *G06F 30/33* (2020.01); *G06F 30/367* (2020.01); *G06F 2119/06* (2020.01)

(58) Field of Classification Search
None
See application file for complete search history.

(56) References Cited

U.S. PATENT DOCUMENTS 8,667,455 B1 * 3/2014 Ho .................. G06F 30/398
716/139
9,881,120 B1 * 1/2018 Ginetti ................. G06F 30/36

OTHER PUBLICATIONS

Das, et al.; Modeling and Characterization of the System-Level Power Delivery Network for a Dual-Core ARM Cortex-A57 Cluster in 28nm CMOS; International Symposium on Low Power Electronics and Design (ISLPED); Jul. 22, 2015. (Year: 2015).*

(Continued)

*Primary Examiner* — Bijan Mapar
(74) *Attorney, Agent, or Firm* — Sterne, Kessler, Goldstein & Fox P.L.L.C.

(57) ABSTRACT

Electronic system level (ESL) design and verification of the present disclosure is utilized to provide an electronic simulation of various loads on one or more batteries of an electronic device resulting from the electronic device performing one or more functional behaviors. Before this electronic simulation occurs, the electronic device is modeled using the high-level software language or the high-level software format. For example, a battery discharge model, a regulator efficiency model, a power delivery network (PDN) model, or a component power model are used to model behaviors of the one or more batteries, regulator circuitry, power delivery network (PDN) circuitry, and other electronic circuits, respectively, of the electronic device. After completion of the modeling of the electronic device, the ESL design and verification of the present disclosure utilizes a simulation algorithm, in conjunction with the high-level software model of the electronic device to simulate the discharge of electrical energy of the one or more batteries.

20 Claims, 5 Drawing Sheets

(51) Int. Cl.
  *G06F 119/06* (2020.01)
  *G06F 30/327* (2020.01)

(56) References Cited

OTHER PUBLICATIONS

Lee, W., Wang, Y., Shin, D., Chang, N., & Pedram, M. (2013). Optimizing the power delivery network in a smartphone platform. IEEE Transactions on Computer-Aided Design of Integrated Circuits and Systems, 33(1), 36-49. (Year: 2013).*

* cited by examiner

ELECTRICAL SYSTEM LEVEL (ESL) BATTERY DISCHARGE SIMULATION

CROSS-REFERENCE TO RELATED APPLICATIONS

The present application claims the benefit of U.S. Provisional Patent Appl. No. 62/491,540 filed Apr. 28, 2017, which is incorporated herein by reference in its entirety.

BACKGROUND

Advances in technology and engineering have allowed designers and manufacturers to offer more portable electronic devices to consumers. These portable electronic devices range from mobile computing devices, also referred to as handheld computers, to mobile communication devices. At the heart of the portable electronic devices lies one or more batteries to provide necessary power for operation. The one or more batteries store energy in a chemical form and convert the stored chemical energy into electrical energy via an electrochemical reaction. Generally, each of the one or more batteries include two electrodes separated by a distance. This distance between the two electrodes conventionally includes an electrolyte that conducts electricity. During operation of the portable electronic devices, a first chemical reaction within a first electrode, called the anode, generates electrons from the first electrode and a second chemical reaction within a second electrode, called the cathode, receives these electrons. This flow of electrons from the anode to the cathode discharges electrical energy from the one or more batteries for operation of the portable electronic devices. The one or more batteries continue to provide this electrical energy until the anode and/or the cathode can no longer perform their respective chemical reactions. Conventionally, the designers and the manufacturers of the portable electronic devices often use rechargeable batteries for the one or more batteries of the portable electronic devices. The chemical energy of the one or more batteries can be restored by applying electrical energy from an outside source to the one or more batteries. This outside source supplies electrons to the anode and removes electrons from the cathode which forces their respective chemical reactions into reverse to replenish the stored chemical energy within the one or more batteries.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
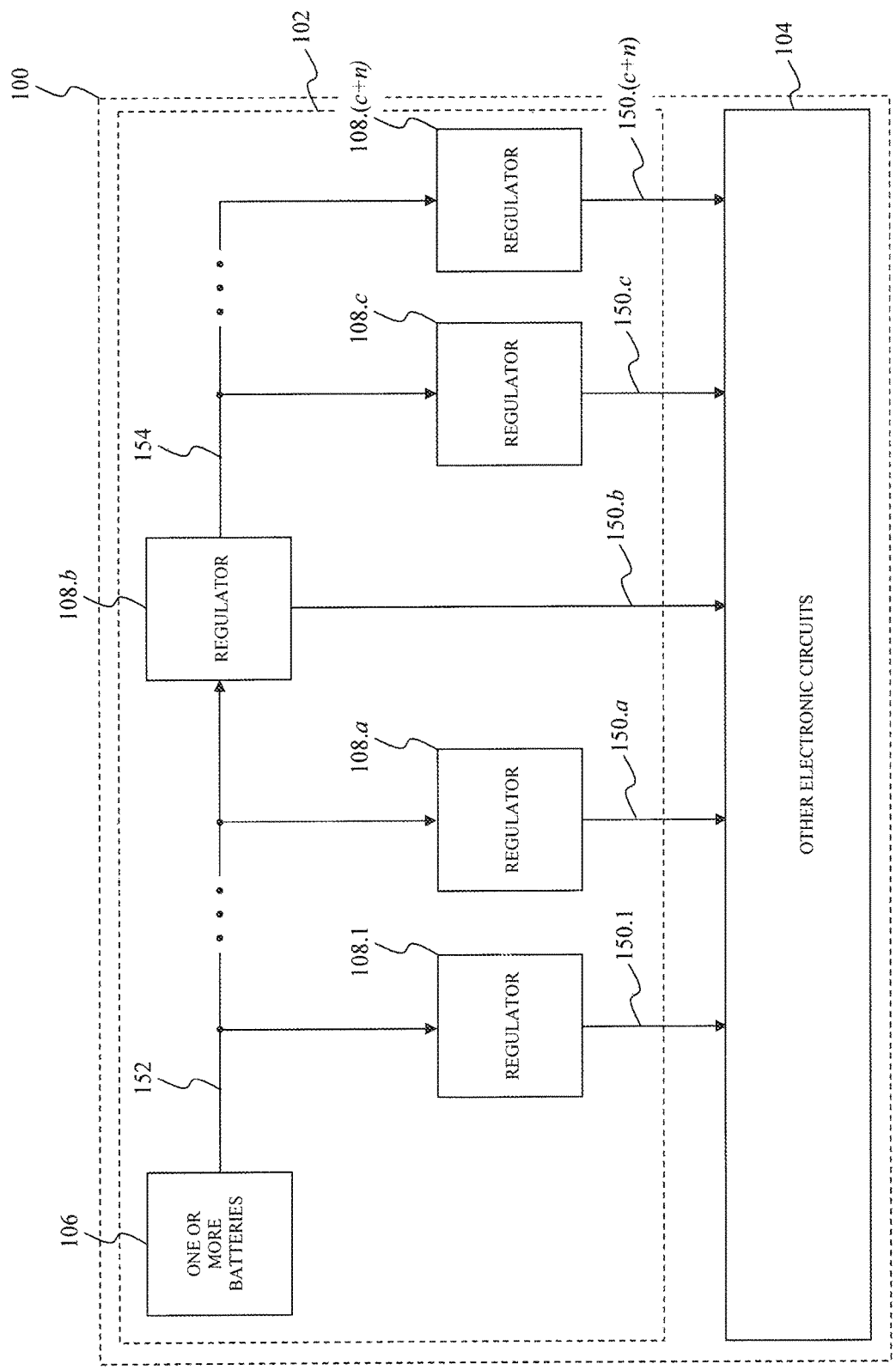
FIG. 1 illustrates a block diagram of an electronic device according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is does not in itself dictate a relationship between the various embodiments and/or configurations discussed.

Conventionally, designers and the manufacturers of portable electronic devices roughly approximate time for discharging of one or more batteries of the portable electronic devices. The discharging describes processes within the one or more batteries which diminish the chemical energy stored in the one or more batteries. This discharging can be considered completed when the first chemical reaction and/or the second chemical reaction no longer produce sufficient power for the portable electronic devices to perform one or more functional behaviors. One conventional formula to roughly approximate the time needed to discharge the one or more batteries of the portable electronic devices is:

$$BL_{Approx} = 0.7 * \frac{BatteryCapacity}{DeviceConsumption}, \quad (1)$$

where $BL_{Approx}$ represents an approximation of in time, usually expressed in hours (h), to discharge the one or more batteries, BatteryCapacity, usually expressed in milliamps hour (mAh) or in milliwatts hour (mWh), represents an energy storage capacity of the one or more batteries as estimated by a manufacturer of the one or more, and DeviceConsumption, milliwatts (mW) or milliwatts hour (mWh), represents a total current consumption of the portable electronic devices. The factor of 0.7 represents a commonly used industry factor to account for external factors, such as temperature, which can affect the first chemical reaction and/or the second chemical reaction.

Overview

Electronic design automation (EDA), also referred to as electronic computer-aided design (ECAD), represents as a category of software tools available to designers and manufacturers for designing portable electronic devices, such as mobile computing devices or mobile communication devices to provide some examples. One type of EDA is referred to as electronic system level (ESL) design and verification. Generally, the ESL design and verification provides a mechanism for system design, verification, and debugging through a software implementation of the portable electronic devices. In this disclosure, the ESL design and verification is utilized to provide a high-level software model of behavior of one or more batteries of an electronic device using a high-level software language, such as a graphical design tool, for example C, System C, C++, LabVIEW, and/or MATLAB, a general purpose system design language, such as like SysML, SMDL and/or SSDL, or any other suitable high-level software language or the high-level software format that will be apparent to those skilled in the relevant art(s) without departing from the spirit and scope of the present disclosure, or a high-level software format, such as Common Power Format (CPF), Unified Power Formant (UPF), or any other suitable high-level software format that will be apparent to those skilled in the relevant art(s) without departing from the spirit and scope of the present disclosure.

The ESL design and verification of the present disclosure is utilized to provide an electronic simulation of various loads on the one or more batteries resulting from the electronic device performing one or more functional behaviors. These loads cause the one or more batteries to discharge electrical energy. This discharge of electrical energy can be a deep discharge in which the one or more batteries are fully discharged or a partial discharge in which the one or more batteries are partially discharged. Before this electronic simulation occurs, the electronic device is modeled using the high-level software language or the high-level software format. For example, a battery discharge model, a regulator efficiency model, a power delivery network (PDN) model, and/or a component power model are used to model behaviors of the one or more batteries, regulator circuitry, power delivery network (PDN) circuitry, and other electronic circuits, respectively, of the electronic device. In this example, these models are used to simulate the discharge of electrical energy of the one or more batteries in relation to a battery discharge rate, regulator efficiency, and/or one or more usage scenarios for the electronic device.

After completion of the modeling of the electronic device, the ESL design and verification of the present disclosure utilizes a simulation algorithm, such as SPICE, Verilog, or VHDL to provide some examples, in conjunction with the high-level software model of the electronic device to simulate the discharge of electrical energy of the one or more batteries. In an exemplary embodiment, this simulation can provide an alternating current (AC) analysis, such as a linear small-signal frequency domain analysis, and/or a direct current (DC) analysis, such as a nonlinear quiescent point calculation or a sequence of nonlinear operating points calculated while sweeping an input voltage or current, or a parameter, of the high-level software model of the electronic device to simulate the discharge of electrical energy of the one or more batteries.

An Exemplary Electronic Device

FIG. 1 illustrates a block diagram of an electronic device according to an exemplary embodiment of the present disclosure. An electronic device 100 represents a specific arrangement of one or more electronic circuits, such as analog circuits and/or digital circuits to provide some examples, which are specifically designed and manufactured to perform one or more functional behaviors. The one or more electronic circuits can include one or more interconnected electronic components that are manufactured and/or designed for placement on a printed circuit board (PCB), within an integrated circuit (IC) package and/or on a IC semiconductor substrate. As illustrated in FIG. 1, the electronic device 100 includes a power delivery network (PDN) 102 to provide power for operation of one or more other electronic circuits 104.

The PDN 102 provides operating voltages 150.1 through 150.(c+n) to the one or more other electronic circuits 104. As illustrated in FIG. 1, the PDN 102 includes one or more batteries 106 and regulators 108.1 through 108.(c+n). In the exemplary embodiment as illustrated in FIG. 1, the one or more batteries 106 and the regulators 108.1 through 108.(c+n) can be implemented as a hierarchical power tree. The one or more batteries store energy 106 in a chemical form and convert the stored chemical energy into electrical energy via an electrochemical reaction. Generally, each of the one or more batteries 106 include two electrodes separated by a distance. This distance between the two electrodes includes an electrolyte that conducts electricity. During operation of the electronic device 100, a first chemical reaction within a first electrode, called the anode, generates electrons from the first electrode and a second chemical reaction within a second electrode, called the cathode, receives these electrons. This flow of electrons from the anode to the cathode discharges electrical energy from the one or more batteries 106 for operation of the portable electronic device 100. As additionally illustrated in FIG. 1, this discharge of electrical energy by the one or more batteries 106 provides a primary battery voltage 152 for operation of the regulators 108.1 through 108.(c+n).

The one or more batteries 106 continue to provide this electrical energy until the anode and/or the cathode can no longer perform their respective chemical reactions. In an exemplary embodiment, the one or more batteries 106 represent one or more rechargeable batteries, such as one or more aluminum-ion batteries, flow batteries, lead-acid batteries, lithium air batteries, lithium-ion batteries, magnesium-ion batteries, molten salt batteries, nickel-cadmium batteries, nickel-cadmium batteries, nickel hydrogen batteries, nickel-iron batteries, nickel metal hydride batteries, nickel-zinc batteries, organic radical batteries, polymer-based batteries, polysulfide bromide batteries, potassium-ion batteries, rechargeable alkaline batteries, rechargeable fuel batteries, silicon air batteries, silver-zinc batteries, silver calcium batteries, sodium-ion batteries, sodium-sulfur batteries, sugar batteries, zinc ion batteries, and/or other suitable rechargeable batteries that will be apparent to those skilled in the relevant art(s) without departing from the spirit and scope of the present disclosure. The chemical energy of the one or more rechargeable batteries can be restored by applying electrical energy from an outside source to the one or more batteries. This outside source supplies electrons to the anode and removes electrons from the cathode which forces their respective chemical reactions into reverse to replenish the stored chemical energy within the one or more batteries 106.

The regulators 108.1 through 108.(c+n) provide the operating voltages 150.1 through 150.(c+n) to the one or more other electronic circuits 104 based upon the primary battery voltage 152. In an exemplary embodiment, each of the regulators 108.1 through 108.(c+n) can be characterized in accordance with a corresponding regulator efficiency ($\eta$) from among regulator efficiencies $\eta_1$ through $\eta_{(c+n)}$. As illustrated in FIG. 1, the regulators 108.1 through 108.(c+n) include a first group of regulators 108.1 through 108.a and/or a second group of regulators 108.b through 108.(c+n). The first group of regulators 108.1 through 108.a regulates the primary battery voltage 152 to provide the operating voltages 150.1 through 150.a. In contrast, the second group of regulators 108.b through 108.(c+n) provides the operating voltages 150.*b* through 150.(*c*+*n*) based upon the primary battery voltage 152. For example, as additionally illustrated in FIG. 1, the regulator 108.*b* regulates the primary battery voltage 152 to provide a secondary regulated voltage 154, which is regulated by the second group of regulators 108.*c* through 108.(*c*+*n*) to provide the operating voltages 150.*c* through 150.(*c*+*n*). It should be noted the configuration and arrangement of the regulators 108.1 through 108.(*c*+*n*) is for exemplary purposes only. Those skilled in the relevant art(s) will recognize that other configurations and arrangements are possible for the regulators 108.1 through 108.(*c*+*n*) without departing from the spirit and scope of the present disclosure. For example, these other configurations and arrangements can include only the first group of regulators 108.1 through 108.*a*, only the second group of regulators 108.*b* through 108.(*c*+*n*), or one or more of the first group of regulators 108.1 through 108.*a* and/or of the second group of regulators 108.*b* through 108.(*c*+*n*) being configured and arranged in a substantially similar manner as the regulator 108.*b* to provide some examples. The regulators 108.1 through 108.(*c*+*n*) can be implemented as one or more linear regulators, switching regulators, one or more silicon controlled rectifiers (SCRs), and/or other suitable regulators that will be apparent to those skilled in the relevant art(s) without departing from the spirit and scope of the present disclosure. In some situations, the regulators 108.1 through 108.(*c*+*n*) can be implemented on an integrated circuit (IC) semiconductor substrate, within an IC package and/or on a IC semiconductor substrate. In other situations, the regulators 108.1 through 108.(*c*+*n*) can be implemented across multiple IC semiconductor substrates, within multiple IC packages and/or on multiple IC semiconductor substrates.

The one or more other electronic circuits 104 receive the operating voltages 150.1 through 150.(*c*+*n*) from the PDN 102. Generally, the operating voltages 150.1 through 150.(*c*+*n*) provide necessary power for operation of the one or more other electronic circuits 104 to perform the one or more functional behaviors of the electronic device 100. The one or more other electronic circuits 104 can include one or more analog circuits, digital circuits, and/or other suitable electronic circuits that will be apparent to those skilled in the relevant art(s) without departing from the spirit and scope of the present disclosure. In an exemplary embodiment, the one or more analog circuits, the one or more digital circuits, and/or the other suitable electronic circuits can represent one or more processors, one or more memories, one or more application-specific integrated circuits (ASICs), and/or one or more physical layer (PHY) devices to provide some examples. In another exemplary embodiment, the electronic device 100 can represent a host device. In this exemplary embodiment, the one or more other electronic circuits 104 can include analog circuits, digital circuits, and/or other suitable electronic circuits that will be apparent to those skilled in the relevant art(s) without departing from the spirit and scope of the present disclosure, such as one or more memoires and/or one or more peripheral devices to provide some example, which are capable to being coupled to the electronic device 100 and are characterized as receiving operational power from the one or more batteries 106.

Modeling of the Electronic Device

Figure 2:
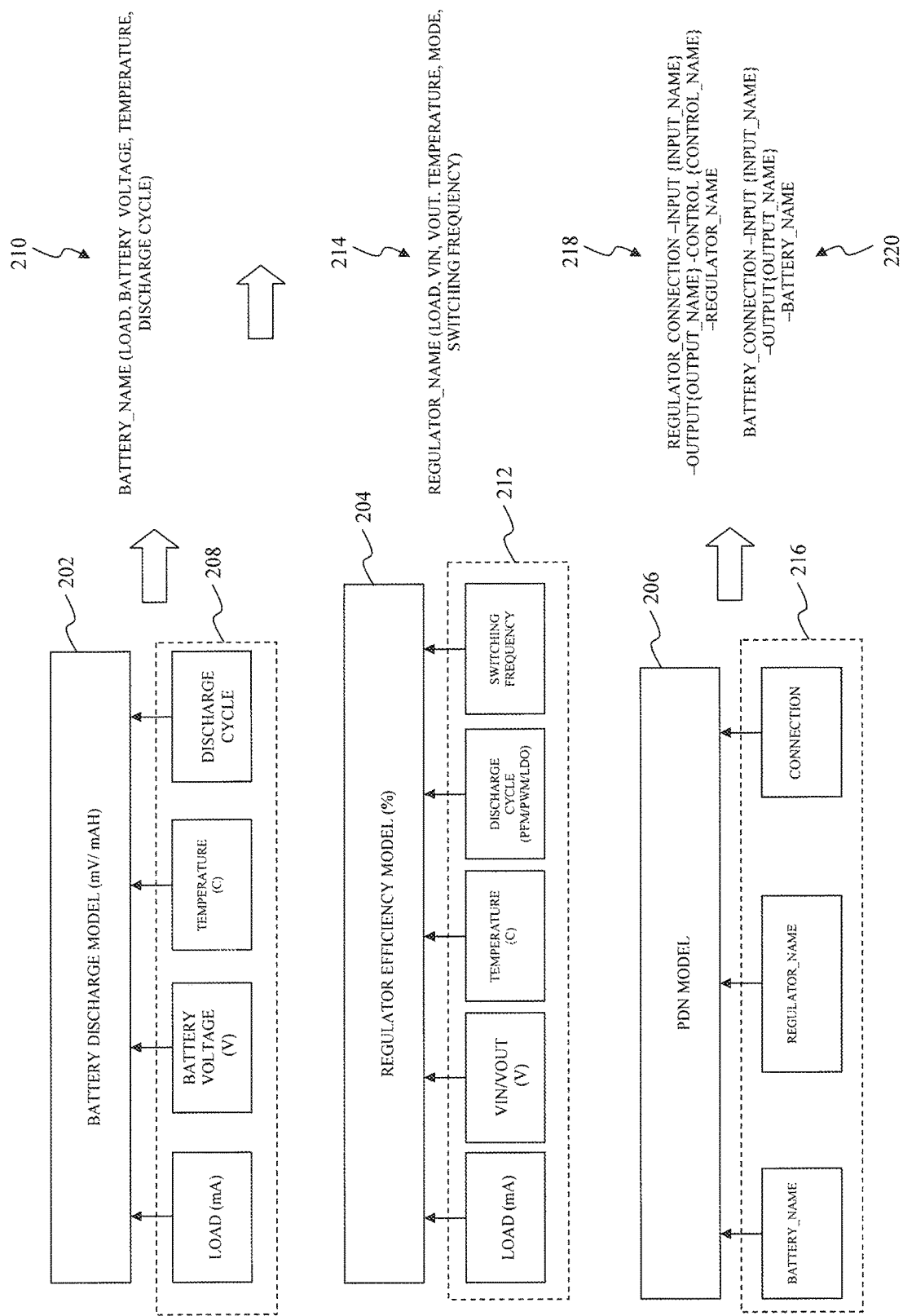
FIG. 2 illustrates exemplary high-level software models for the electronic device according to an exemplary embodiment of the present disclosure.

FIG. 2 illustrates exemplary high-level software models for the electronic device according to an exemplary embodiment of the present disclosure. As discussed above, the ESL design and verification provides a mechanism for system design, verification, and debugging through a software design implementation of the electronic device 100. Although the ESL design and verification is available to design, to verify, and to debug a wide-variety of aspects of the electronic device 100, the present disclosure utilizes the ESL design and verification to provide a high-level software model of the one or more batteries 106 using the high-level software language or the high-level software format. Those skilled in the relevant art(s) will recognize that other ESL designs and verifications are available to design, to verify, and to debug other aspects of the electronic device 100 and these other ESL designs and verifications can be used in conjunction with the ESL design and verification disclosed herein to design, to verify, and to debug the electronic device 100 without departing from the spirit and scope of the present disclosure. As illustrated in FIG. 2, a battery discharge model 202 for the one or more batteries 106, a regulator efficiency model 204 for the regulators 108.1 through 108.(*c*+*n*), and a PDN model 206 for the PDN 102 can be used to model behaviors of the one or more batteries 106, the PDN 102, and the regulators 108.1 through 108.(*c*+*n*), and the PDN 102, respectively. As to be discussed in further detail below, the battery discharge model 202, the regulator efficiency model 204, and the PDN model 206 can be used in connection with a component power model for the one or more other electronic circuits 104 to model of behavior of the one or more batteries 106. The component power model for the one or more other electronic circuits 104 is further described in U.S. patent application Ser. No. 15/260,143, filed on Sep. 8, 2016, which is incorporated herein by reference in its entirety.

Generally, the battery discharge model 202, the regulator efficiency model 204, and/or the PDN model 206 represent one or more functional characterizations of various parameters and/or attributes of the one or more batteries 106, the regulators 108.1 through 108.(*c*+*n*), and/or the PDN 102, respectively. The one or more functional characterizations of the various parameters and/or attributes are utilized to form a text netlist describing the electronic device 100. As illustrated in FIG. 2, the battery discharge model 202 represents a functional characterizations of parameters and/or attributes 208 for the one or more batteries 106. These parameters and/or attributes 208 can include load (mA), battery voltage (V), temperature (C), discharge cycle, switching frequency and/or any other suitable parameter and/or attribute for the one or more batteries 106 that will be apparent to those skilled in the relevant art(s) without departing from the spirit and scope of the present disclosure. The battery discharge model 202 can be modeled as a battery functional expression 210, such as BATTERY_NAME (LOAD, BATTERY VOLTAGE, TEMPERATURE, DISCHARGE CYCLE, SWITCHING FREQUENCY) as illustrated in FIG. 2 to provide an example.

As additionally illustrated in FIG. 2, the regulator efficiency model 204 represents a functional characterizations of parameters and/or attributes 212 for the regulators 108.1 through 108.(*c*+*n*). These parameters and/or attributes 212 can include load (mA), battery voltage (V), temperature (C), mode (PFM/PWM), and/or any other suitable parameter and/or attribute of regulators 108.1 through 108.(*c*+*n*) that will be apparent to those skilled in the relevant art(s) without departing from the spirit and scope of the present disclosure. The regulator efficiency model 204 can be modeled in terms of one or more regulator efficiency functional expressions 214, such as REGULATOR_NAME (LOAD, VIN, VOUT, TEMPERATURE, MODE) as illustrated in FIG. 2 to provide an example. In some situations, each of the one or more regulator efficiency functional expressions 214 corresponds to a functional characterization of one of the regulators 108.1 through 108.($c+n$). In these situations, the regulator efficiency model 204 includes ($c+n$) regulator efficiency functional expressions 214, each of the ($c+n$) regulator efficiency functional expressions 214 corresponding to one of the regulators 108.1 through 108.($c+n$).

The PDN model 206 is utilized to generate a text netlist describing the electronic device 100. As further illustrated in FIG. 2, the PDN model 206 represents functional characterizations of parameters and/or attributes 216 for the PDN 102. These parameters and/or attributes 216 can include the battery functional expression 210, denoted as BATTERY_NAME, the one or more regulator efficiency functional expressions 214, denoted as REGULATOR_NAME, reference designators of one or more connections for the one or more batteries 106 and the regulators 108.1 through 108.($c+n$), and/or any other suitable parameter and/or attribute for the PDN 102 that will be apparent to those skilled in the relevant art(s) without departing from the spirit and scope of the present disclosure. The parameters and/or attributes 216 can include reference designators of power nets, reference designators of power ports, reference designators of control ports for the one or more batteries 106 and the regulators 108.1 through 108.($c+n$), to provide some examples. The PDN model 206 can be modeled in terms of one or more PDN functional expressions 218 and 220, such as REGULATOR_CONNECTION–INPUT {INPUT_NAME}–OUTPUT {OUTPUT_NAME}–CONTROL {CONTROL_NAME}–REGULATOR_NAME or BATTERY_CONNECTION–INPUT{INPUT_NAME}–OUTPUT{OUTPUT_NAME}-BATTERY_NAME as illustrated in FIG. 2 to provide some examples. The PDN functional expression 218, namely REGULATOR_CONNECTION, assigns various reference designators to various input/output (IO) circuit nodes for one of the regulators 108.1 through 108.($c+n$). Similarly, the PDN functional expression 220, namely BATTERY_CONNECTION, assigns various reference designators to various IO circuit nodes for the one or more batteries 106.

Simulating the Model of the Electronic Device

After completion of the modeling of the electronic device 100, the ESL design and verification of the present disclosure utilizes the simulation algorithm in conjunction with the battery discharge model 202, the regulator efficiency model 204, the PDN model 206, and the component power model for the one or more other electronic circuits 104 as described in U.S. patent application Ser. No. 15/260,143, filed on Sep. 8, 2016, which is incorporated herein by reference in its entirety, to simulate the discharge of electrical energy of the one or more batteries 106.

Figure 3:
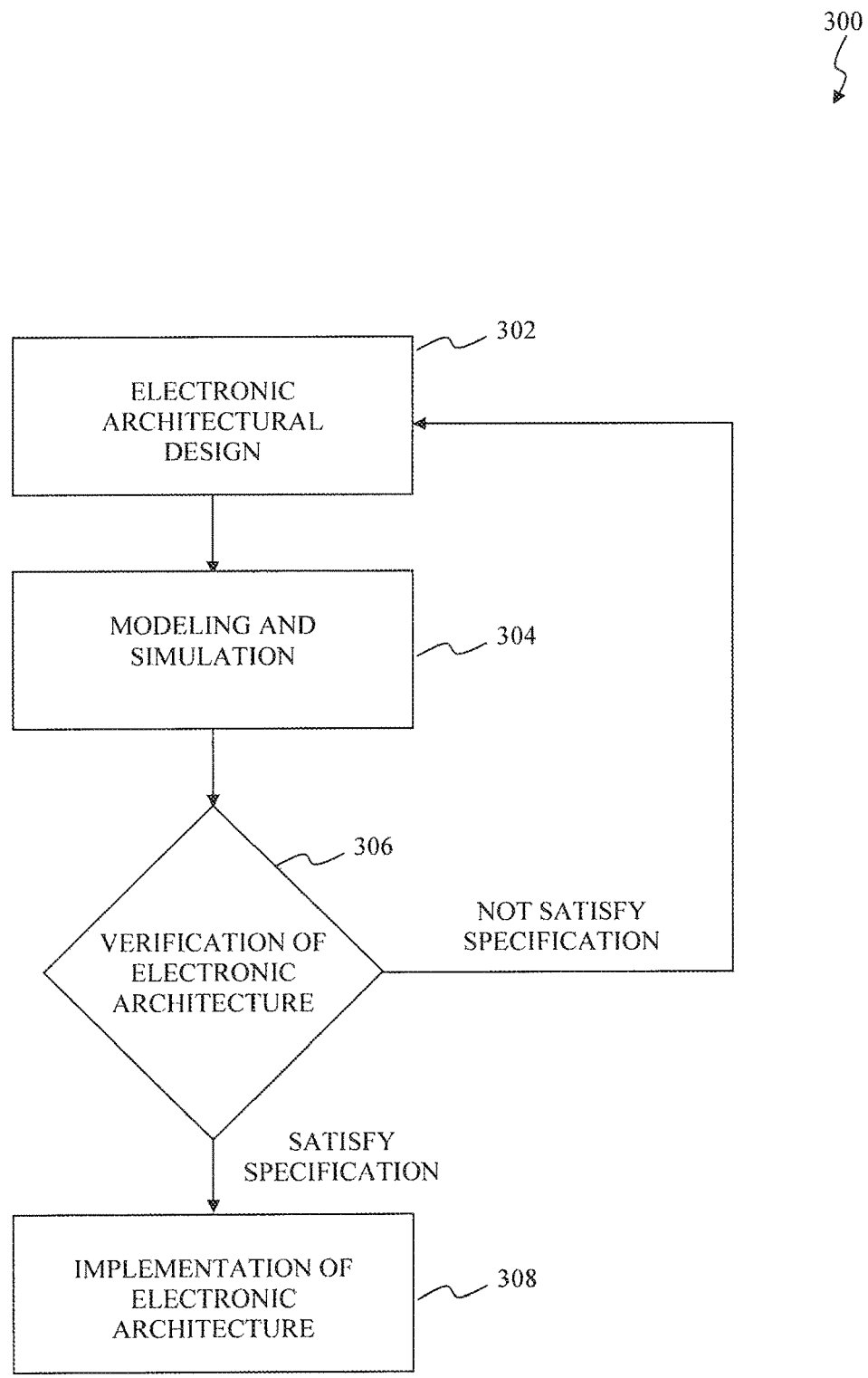
FIG. 3 illustrates a flowchart of an exemplary operational control flow incorporating a simulation algorithm of the electronic device according to an exemplary embodiment of the present disclosure.

FIG. 3 illustrates a flowchart of an exemplary operational control flow incorporating a simulation algorithm of the electronic device according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 in designing and manufacturing the electronic device 100. In an exemplary embodiment, the exemplary operational control flow 300, as well as other exemplary operational control flows to be discussed herein, can be implemented in hardware, firmware, software, or any combination thereof. As another example, the exemplary operational control flow 300, as well as other exemplary operational control flows to be discussed herein, can be implemented as instructions stored on a machine-readable medium, which may be read and executed by one or more processors. A machine-readable medium may include any mechanism for storing or transmitting information in a form readable by a machine (e.g., a computing device). A machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices that will be apparent to those skilled in the relevant art(s) executing the firmware, software, routines, and/or instructions.

At step 302, the operational control flow 300 develops an electronic architectural design for the electronic device 100. In an exemplary embodiment, the electronic architectural design includes the PDN 102, having the one or more batteries 106 and the regulators 108.1 through 108.($c+n$), and/or the one or more other electronic circuits 104 of the electronic device 100 as described in FIG. 1. The electronic architectural design can be developed in accordance with an electronic design specification. The electronic design specification can outline one or more requirements for one or more functional behaviors for the electronic architectural design. In some situations, one or more of these functional behavioral requirements can be outlined terms of operational usage time, for example, a minimal operational usage time, before the one or more batteries 106 are discharged. For example, the electronic design specification can outline the electronic architectural design is to provide two hours of talktime or ten hours of audio playback before the one or more batteries 106 are discharged. In an exemplary embodiment, the electronic architectural design represents an ESL synthesis, also referred to as a high-level synthesis (HLS), of the electronic architectural design using the high-level software language or the high-level software format at a register-transfer level (RTL). Generally, the high-level software language or the high-level software format interprets an algorithmic description of the electronic device 100 to create a software implementation of analog and/or digital circuitry as the electronic architectural design. For example, the high-level software language or the high-level software format creates a software implementation of analog and/or digital circuitry for the PDN 102 and/or the one or more other electronic circuits 104 of the electronic device 100 as described in FIG. 1. The high-level software language or the high-level software format can include a graphical design tool, for example C, C++, LabVIEW, and/or MATLAB, a general purpose system design language, such as a Systems Modeling Language (SysML), a Semantic Model Definition Language (SMDL) and/or a schema definition language (SSDL), or any other suitable high-level software language or the high-level software format that will be apparent to those skilled in the relevant art(s) without departing from the spirit and scope of the present disclosure.

At step 304, the operational control flow 300 simulates the electronic architectural design from step 302 to determine whether one or more functional behaviors of the electronic architectural design from step 302, such as batterylife to provide an example, satisfies the electronic design specification from step 302. Before this electronic simulation occurs, the electronic architectural design from step 302 is modeled using the high-level software language or the high-level software format. For example, the operational control flow 300 generates the battery discharge model 202, the regulator efficiency model 204, and/or the PDN model 206, and/or the component power model as described in FIG. 2 using the high-level software language or the high-level software format. After completion of the modeling of the electronic architectural design from step 302, the operational control flow 300 utilizes a simulation algorithm, such as SPICE, Verilog, or VHDL to provide some examples, in conjunction with the high-level software model of the electronic architectural design to simulate the discharge of electrical energy of the one or more batteries 106 while the electronic architectural design from step 302 is performing the one or more functional behaviors. In some situations, the simulation algorithm utilizes a text netlist describing the electronic architectural design from step 302 and translates this text netlist into one or more equations, such as nonlinear differential algebraic equations to provide an example, to be solved. In these situations, the simulation algorithm can provide an alternating current (AC) analysis, such as a linear small-signal frequency domain analysis, and/or a direct current (DC) analysis, such as a nonlinear quiescent point calculation or a sequence of nonlinear operating points calculated while sweeping an input voltage or current or a parameter, of the electronic architectural design from step 302. In an exemplary embodiment, the AC analysis and/or the DC analysis can be used to determine the discharge of electrical energy of the one or more batteries 106. The simulation of step 304 is further described in FIG. 4. In another exemplary embodiment, the simulation algorithm can compare different branches of the hierarchical power tree to determine which of these different branches can be characterized as having a longest discharge time.

At step 306, the operational control flow 300 verifies whether the one or more simulated functional behaviors of the electronic architectural design from step 304 satisfies the electronic design specification from step 302. For example, the operational control flow 300 verifies the discharge of electrical energy of the one or more batteries 106 while the electronic architectural design from step 302 is performing the one or more functional behaviors, such as talktime or audio playback to provide some examples, satisfies requirements for the discharge of electrical energy as outlined in the electronic design specification from step 302, such as two hours of talktime or ten hours of audio playback to provide some examples. The operational control flow 300 proceeds to step 308 when the simulated one or more functional behaviors of the electronic architectural design from step 304 satisfies the electronic design specification from step 302. Otherwise, the simulated one or more functional behaviors of the electronic architectural design from step 304 do not satisfy the electronic design specification from step 302. In this situation, the operational control flow 300 reverts to step 302 to alter the electronic architectural design from step 302 and/or the electronic design specification from step 302.

At step 308, the operational control flow 300 fabricates the electronic architectural design from step 302 onto an integrated circuit (IC) semiconductor substrate when the simulated one or more functional behaviors of the electronic architectural design from step 304 satisfy the electronic design specification from step 302 to form the electronic device 100. The operational control flow 300 creates a representation of the electronic architectural design from step 304 in terms of planar geometric shapes which correspond to diffusion layers, polysilicon layers, metal layers, and/or interconnections between layers. Thereafter, the operational control flow 300 translates these planar geometric shapes into one or more photomasks for fabrication onto the IC semiconductor substrate. In some situations, the electronic architectural design from step 302 is converted into an industry standard file format before this translation can occur. For example, the electronic architectural design from step 302 can be converted from RTL format to a version of a Graphic Database System (GDS) format. Once the electronic architectural design of step 302 is fabricated onto the IC semiconductor substrate using the one or more photomasks to form the electronic device 100, the electronic device 100 can be tested in a laboratory environment to verify one or more functional behaviors of electronic device 100 satisfies the electronic design specification from step 302.

Exemplary Simulation Algorithm

Figure 4:
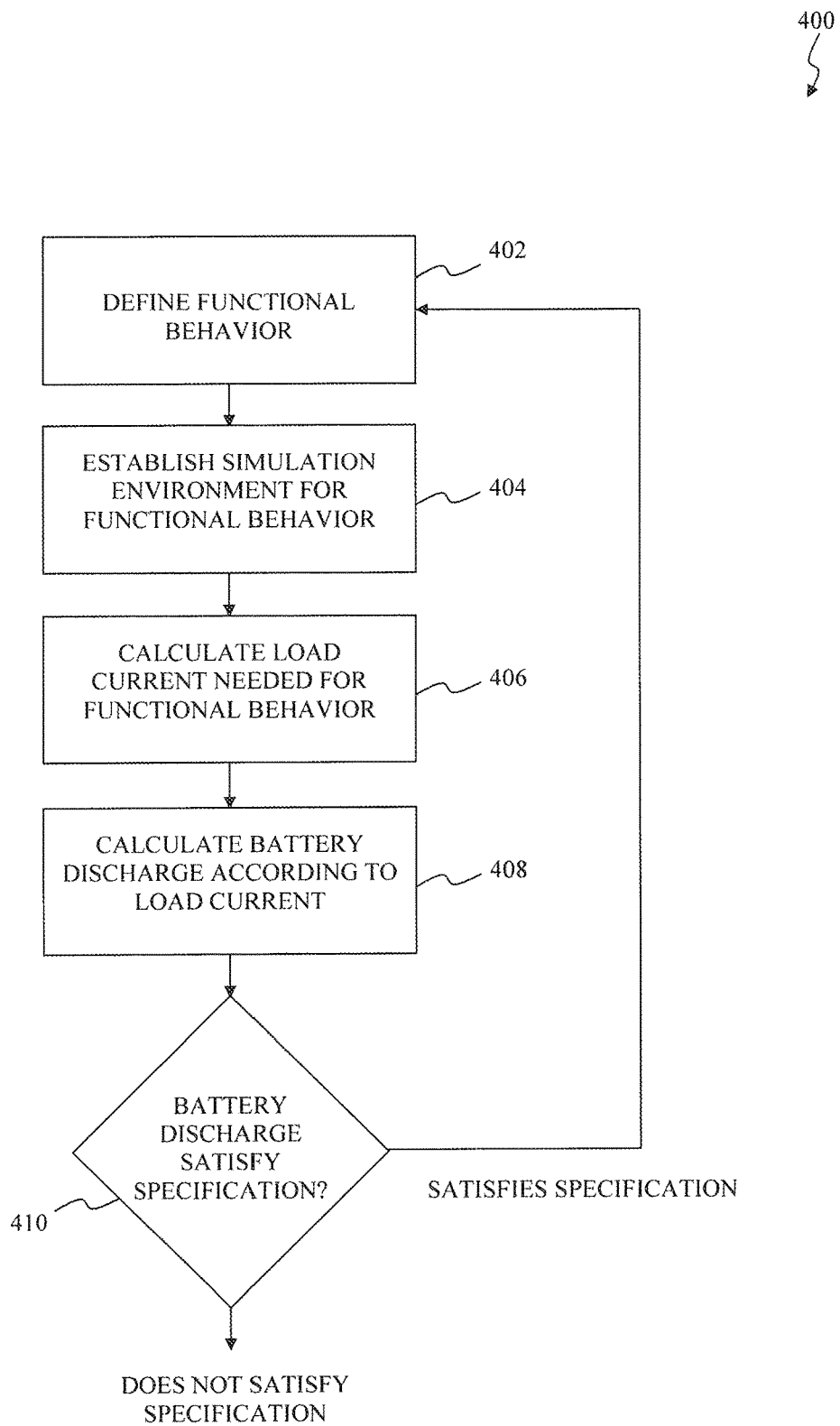
FIG. 4 illustrates a flowchart of an exemplary simulation algorithm according to an exemplary embodiment of the present disclosure.

FIG. 4 illustrates a flowchart of an exemplary simulation algorithm according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 in simulating the discharge of the electrical energy of the one or more batteries 106 of the electronic architectural design from step 302. The operational control flow 400 can represent an exemplary embodiment of step 304 as described above in FIG. 3.

At step 402, the operational control flow 400 determines one or more functional behaviors for the electronic architectural design to be simulated. For example, the one or more functional behaviors can include the electronic architectural design providing two hours of talktime or ten hours of audio playback. In an exemplary embodiment, the operational control flow 400 can additionally assign various parameters and/or attributes to the one or more functional behaviors. In this exemplary embodiment, these various parameters and/or attributes can relate to the one or more batteries 106, such as a starting voltage, $V_{BAT}(START)$, for the one or more batteries 106 which corresponds to a voltage present in the one or more batteries 106 before simulating the one or more functional behaviors, a stopping voltage, $V_{BAT}(STOP)$, for the one or more batteries 106 which corresponds to a voltage present in the one or more batteries 106 after simulating the one or more functional behaviors, and/or a voltage tolerance to accommodate for various environmental factors, such as temperature and humidity to provide some examples.

At step 404, the operational control flow 400 establishes a simulation environment for simulating the one or more functional behaviors from step 402. In an exemplary embodiment, the simulation environment includes one or more high-level software models of the electronic architectural design, such as the battery discharge model 202, the regulator efficiency model 204, the PDN model 206, and/or the component power model as described in FIG. 2 above.

At step 406, the operational control flow 400 calculates a load current needed to be supplied by the one or more batteries 106 to perform the one or more functional behaviors from step 402. In some situations, the operational control flow 400 can calculate the load current from the simulation environment of step 402. For example, the operational control flow 400 can calculate the load current according to:

$$\text{LOAD}(t) = \frac{\sum_{i=1}^{(c+n)} \frac{POWER_l(t)}{\eta(POWER_l(t))}}{V_{BAT}(t)}, \quad (2)$$

where LOAD(t) represents the load current, expressed in mA, needed to be supplied by the one or more batteries 106 during a time t, $POWER_i(t)$ represents the power to be supplied by an $i^{th}$ regulator from among the regulators 108.1 through 108.(c+n) to the other electronic circuits 104 of the electronic architectural design to perform the one or more functional behaviors, and η represents an efficiency of the $i^{th}$ regulator from among the from among regulator efficiencies $\eta_1$ through $\eta_{(c+n)}$.

At step 408, the operational control flow 400 calculates the discharge of the one or more batteries 106 to provide the load current from step 406. Generally, each of the one or more batteries 106 include two electrodes separated by a distance. This distance between the two electrodes conventionally includes an electrolyte that conducts electricity. During operation of the electronic architectural design, the operational control flow 400 effectively simulates a first chemical reaction within a first electrode, called the anode, which generates electrons from the first electrode and a second chemical reaction within a second electrode, called the cathode, which receives these electrons. This simulation of the flow of electrons from the anode to the cathode simulates the discharge of electrical energy from the one or more batteries. As the one or more batteries 106 are simulated to provide the load current from step 406, the operational control flow 400 simulates the first chemical reaction and the second chemical reaction diminishing the stored chemical energy within the one or more batteries 106. The operational control flow 400 simulates this diminishing stored chemical energy in step 408 by calculating the voltage of the one or more batteries 106 at various instances in time, for example, milliseconds or seconds. In an exemplary embodiment, the various instances in time can be based on power state changes of the one or more other electronic circuits 104. In this exemplary embodiment, the one or more other electronic circuits 104 can change operational states while performing the one or more functional behaviors from step 402. These operational states are associated with power state changes in the amount of power needed by the one or more other electronic circuits 104 to operate under the operational states. For example, the voltage of the one or more batteries 106 at each instance in time can be calculated by:

$$V_{BAT}(START+\Delta t(i))=V_{BAT}(START)-\Delta t(i)*DR, \quad (3)$$

where $V_{BAT}(START)$ represents the starting voltage, $V_{BAT}(START)$, for the one or more batteries 106 from step 402, $V_{BAT}(START+\Delta t(i))$ represents the voltage of the one or more batteries 106 at a time $\Delta t(i)$ subsequent to a start time START of the simulation, and DR represents a discharge rate of the one or more batteries 106. In an exemplary embodiment, the discharge rate of the one or more batteries 106 represents a measure of a rate at which the one or more batteries 106 are discharged relative to their maximum capacity usually a function relating to $V_{BAT}(START)$, the load current from step 406, and/or temperature in Celsius. In some situations, manufacturers of the one or more batteries 106 specify the discharge rate of the one or more batteries 106 in terms of load current and temperature. In these situations, the operational control flow 400 can store the discharge rate of the one or more batteries 106 in terms of load current and temperature in a tabular form as a look-up table (LUT) to provide an example.

At step 410, the operational control flow 400 verifies whether the discharge of the one or more batteries 106 calculated in step 408 satisfies an electronic design specification, such as the electronic design specification from step 302. In an exemplary embodiment, the operational control flow 400 verifies whether the calculated $V_{BAT}(START+\Delta t(i))$ from step 408 satisfies the electronic design specification, such as the stopping voltage, $V_{BAT}(STOP)$, from step 402 to provide an example. In this exemplary embodiment, the operational control flow 400 compares the $V_{BAT}(START+\Delta t(i))$ from step 408 with the stopping voltage, $V_{BAT}(STOP)$, for the one or more batteries 106 from step 402. Also in this exemplary embodiment, the operational control flow 400 determines the one or more batteries 106 do not satisfy the electronic design specification when the $V_{BAT}(START+\Delta t(i))$ from step 408 is less than the stopping voltage, $V_{BAT}(STOP)$, for the one or more batteries 106. In this situation, the operational control flow 400 reverts to alter the electronic architectural design and/or the electronic design specification. Otherwise, in this exemplary embodiment, the operational control flow 400 determines the one or more batteries 106 satisfy the electronic design specification when the $V_{BAT}(START+\Delta t(i))$ from step 408 is greater than or equal to the stopping voltage, $V_{BAT}(STOP)$, for the one or more batteries 106 from step 402. In this situation, the operational control flow 400 reverts to step 402 to define other behaviors for other simulations. In another exemplary embodiment, the operational control flow 400 compares a difference between the $V_{BAT}(START+\Delta t(i))$ from step 408 and the stopping voltage, $V_{BAT}(STOP)$, for the one or more batteries 106 from step 402 to the voltage tolerance from step 402. In this other exemplary embodiment, the operational control flow 400 determines the one or more batteries 106 do not satisfy the electronic design specification when the difference is less than the voltage tolerance from step 402. Otherwise, in this exemplary embodiment, the operational control flow 400 determines the one or more batteries 106 satisfy the electronic design specification when the difference is greater than or equal to the voltage tolerance from step 402.

Exemplary Computer System for Simulating and Modeling the Electronic Device

Figure 5:
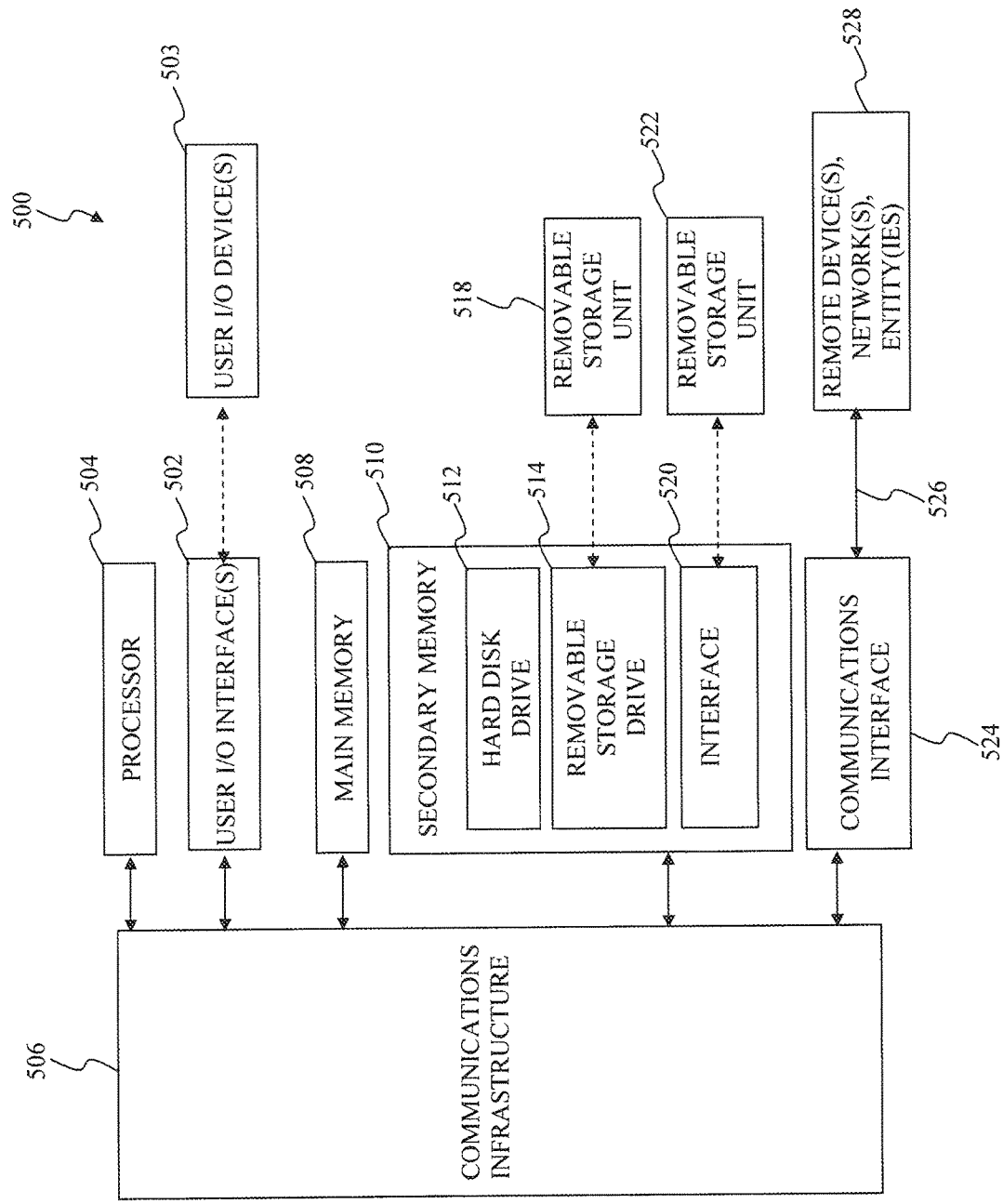
FIG. 5 illustrates a block diagram of an exemplary computer system for simulating and modeling the exemplary electronic device according to an exemplary embodiment of the present disclosure.

FIG. 5 illustrates a block diagram of an exemplary computer system 500 for simulating and modeling the exemplary electronic device according to an exemplary embodiment of the present disclosure. Various embodiments are described in terms of this example computer system 500. After reading this description, it will become apparent to a person skilled in the relevant art how to implement embodiments using other computer systems and/or computer architectures.

The computer system 500 includes one or more processors 504, also referred to as central processing units, or CPUs, to simulate and/or model the electronic device 100 and/or the electronic architectural design as described above in FIG. 1 through FIG. 4. The one or more processors 504 can be connected to a communication infrastructure or bus 506. In an exemplary embodiment, one or more of the one or more processors 504 can be implemented as a graphics processing unit (GPU). The GPU represents a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

The computer system 500 also includes user input/output device(s) 503, such as monitors, keyboards, pointing devices, etc., which communicate with communication infrastructure 506 through user input/output interface(s) 502.

The computer system 500 also includes a main or primary memory 508, such as a random access memory (RAM) to provide an example. The main memory 508 can include one or more levels of cache. The main memory 508 has stored therein control logic (i.e., computer software) and/or data, such as the simulation algorithm as described in FIG. 1 through FIG. 4 and/or any of the models for the electronic device 100 and/or the electronic architectural design as described in FIG. 1 through FIG. 4.

The computer system 500 can also include one or more secondary storage devices or memory 510 to store the simulation algorithm as described in FIG. 1 through FIG. 4 and/or any of the models for the electronic device 100 and/or the electronic architectural design as described in FIG. 1 through FIG. 4 to provide some examples. The one or more secondary storage devices or memory 510 can include, for example, a hard disk drive 512 and/or a removable storage device or drive 514. The removable storage drive 514 may be a floppy disk drive, a magnetic tape drive, a compact disk drive, an optical storage device, tape backup device, a flash storage device, and/or any other storage device/drive. The removable storage drive 514 may interact with a removable storage unit 518. The removable storage unit 518 includes a computer usable or readable storage device having stored thereon computer software (control logic) and/or data. The removable storage unit 518 may be a floppy disk, magnetic tape, compact disk, DVD, optical storage disk, flash storage device, and/any other computer data storage device. The removable storage drive 514 reads from and/or writes to removable storage unit 518 in a well-known manner.

According to an exemplary embodiment, the one or more secondary storage devices or memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication or network interface 524 enables the computer system 500 to communicate and interact with any combination of remote devices, remote networks, remote entities, etc. (individually and collectively referenced by reference number 528). For example, the communication or network interface 524 may allow the computer system 500 to communicate with the remote devices 528 over a communications path 526, which may be wired and/or wireless, and which may include any combination of LANs, WANs, the Internet, etc. Control logic and/or data may be transmitted to and from the computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

The foregoing Detailed Description discloses a method for simulating discharge of one or more batteries of an electronic device. The method includes developing, by a computer system, an electronic architectural design to perform one or more functional behaviors of the electronic device in accordance with an electronic design specification, modeling, by the computer system, a power delivery network (PDN) of the electronic architectural design and one or more other electronic circuits of the electronic architectural design that receive power from the PDN, simulating, by the computer system using the modeling, the discharge of the one or more batteries while the electronic architectural design is performing the one or more functional behaviors, and determining, by the computer system, whether the simulated discharge of the one or more batteries satisfies the electronic design specification.

The foregoing Detailed Description also discloses a computer system for simulating discharge of one or more batteries of an electronic device. The computer includes a memory that stores instructions and a processor in communication with the memory. The instructions, when executed by the processor, configure the processor the processor to: develop an electronic architectural design to perform one or more functional behaviors of the electronic device in accordance with an electronic design specification, model a power delivery network (PDN) of the electronic architectural design and one or more other electronic circuits of the electronic architectural design that receive power from the PDN, simulate, using the modeled PDN and the modeled one or more other electronic circuits, the discharge of the one or more batteries while the electronic architectural design is performing the one or more functional behaviors, and determine whether the simulated discharge of the one or more batteries satisfies the electronic design specification.

The foregoing Detailed Description further discloses a non-transitory computer-readable medium having instructions stored thereon that, when executed by a computer system, causes the computer system to perform operations. The operations include developing, by the computer system, an electronic architectural design to perform one or more functional behaviors of the electronic device in accordance with an electronic design specification, modeling, by the computer system, a power delivery network (PDN) of the electronic architectural design and one or more other electronic circuits of the electronic architectural design that receive power from the PDN, simulating, by the computer system using the modeling, the discharge of the one or more batteries while the electronic architectural design is performing the one or more functional behaviors, and determining, by the computer system, whether the simulated discharge of the one or more batteries satisfies the electronic design specification.

The foregoing Detailed Description outlines features of several embodiments so that those of ordinary skill in the art may better understand the aspects of the present disclosure.

Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method for simulating discharge of one or more batteries of an electronic device, the method comprising:
   developing, by a computer system, an electronic architectural design to perform one or more functional behaviors of the electronic device in accordance with an electronic design specification;
   modeling, by the computer system, a power delivery network (PDN) of the electronic architectural design and one or more other electronic circuits of the electronic architectural design that receive power from the PDN;
   simulating, by the computer system using the modeling, the discharge of the one or more batteries while the electronic architectural design is performing the one or more functional behaviors;
   determining, by the computer system, whether the simulated discharge of the one or more batteries satisfies the electronic design specification; and
   representing, by the computer system, the electronic architectural design in terms of planar geometric shapes for fabrication onto an integrated circuit (IC) semiconductor substrate when the simulated discharge of the one or more batteries satisfies the electronic design specification.

2. The method of claim 1, wherein the electronic architectural design comprises:
   an electronic system level (ESL) synthesis of analog and/or digital circuitry of the electronic device.

3. The method of claim 1, wherein the modeling comprises:
   determining a battery discharge model representing functional characterizations of parameters and/or attributes for the one or more batteries in relation to load, battery voltage, temperature, or discharge cycle;
   determining a regulator efficiency model representing functional characterizations of parameters or attributes for regulators of the PDN in relation to load, battery voltage, temperature, or mode; and
   determining a PDN model to describe connections of the PDN in relation to the battery discharge model and the regulator efficiency model.

4. The method of claim 1, wherein the simulating comprises:
   calculating, by the computer system, a load current needed by the one or more other electronic circuits to perform the one or more functional behaviors; and
   calculating, by the computer system, the discharge of the one or more batteries when providing the load current.

5. The method of claim 1, wherein the PDN is implemented as a hierarchical power tree, and
   wherein the simulating comprises:
   comparing different branches of the hierarchical power tree to determine which of the different branches is characterized as having a longest discharge time.

6. The method of claim 1, further comprising:
   adjusting, by the computer system, the electronic architectural design or the electronic design specification when the simulated discharge of the one or more batteries does not satisfy the electronic design specification.

7. A computer system for simulating discharge of one or more batteries of an electronic device, the computer system comprising:
   a memory that stores instructions;
   a processor, in communication with the memory, configured to execute the instructions, wherein the instructions, when executed by the processor, configure the processor to:
   develop an electronic architectural design to perform one or more functional behaviors of the electronic device in accordance with an electronic design specification,
   model a power delivery network (PDN) of the electronic architectural design and one or more other electronic circuits of the electronic architectural design that receive power from the PDN,
   simulate, using the modeled PDN and the modeled one or more other electronic circuits, the discharge of the one or more batteries while the electronic architectural design is performing the one or more functional behaviors,
   determine whether the simulated discharge of the one or more batteries satisfies the electronic design specification, and
   represent the electronic architectural design in terms of planar geometric shapes for fabrication onto an integrated circuit (IC) semiconductor substrate when the simulated discharge of the one or more batteries satisfies the electronic design specification.

8. The computer system of claim 7, wherein the electronic architectural design comprises:
   an electronic system level (ESL) synthesis of analog or digital circuitry of the electronic device.

9. The computer system of claim 7, wherein the modeled PDN comprises:
   a battery discharge model representing functional characterizations of parameters or attributes for the one or more batteries in relation to load, battery voltage, temperature, or discharge cycle;
   a regulator efficiency model representing functional characterizations of parameters or attributes for regulators of the PDN in relation to load, battery voltage, temperature, or mode; and
   a PDN model to describe connections of the PDN in relation to the battery discharge model and the regulator efficiency model.

10. The computer system of claim 7, wherein the instructions, which when executed by the processor, further configure the processor to:
   calculate a load current needed by the one or more other electronic circuits to perform the one or more functional behaviors; and
   calculate the discharge of the one or more batteries when providing the load current.

11. The computer system of claim 7, wherein the PDN is implemented as a hierarchical power tree, and
   wherein the instructions, which when executed by the processor, configure the processor to compare different branches of the hierarchical power tree to determine which of the different branches is characterized as having a longest discharge time.

12. The computer system of claim 7, wherein the instructions, which when executed by the processor, further configure the processor to:
adjust the electronic architectural design or the electronic design specification when the simulated discharge of the one or more batteries does not satisfy the electronic design specification.

13. A non-transitory computer-readable medium having instructions stored thereon that, when executed by a computer system, causes the computer system to perform operations, the operations comprising:
developing an electronic architectural design to perform one or more functional behaviors of an electronic device in accordance with an electronic design specification;
modeling a power delivery network (PDN) of the electronic architectural design and one or more other electronic circuits of the electronic architectural design that receive power from the PDN;
simulating, using the modeling, discharge of one or more batteries while the electronic architectural design is performing the one or more functional behaviors;
determining whether the simulated discharge of the one or more batteries satisfies the electronic design specification; and
representing the electronic architectural design in terms of planar geometric shapes for fabrication onto an integrated circuit (IC) semiconductor substrate when the simulated discharge of the one or more batteries satisfies the electronic design specification.

14. The non-transitory computer-readable medium of claim 13, wherein the electronic architectural design comprises:
an electronic system level (ESL) synthesis of analog or digital circuitry of the electronic device.

15. The non-transitory computer-readable medium of claim 13, wherein the modeling comprises:
determining a battery discharge model representing a functional characterizations of parameters or attributes for the one or more batteries in relation to load, battery voltage, temperature, or discharge cycle;
determining a regulator efficiency model representing functional characterizations of parameters or attributes for regulators of the PDN in relation to load, battery voltage, temperature, or mode; and
determining a PDN model to describe connections of the PDN in relation to the battery discharge model and the regulator efficiency model.

16. The non-transitory computer-readable medium of claim 13, wherein the simulating comprises:
calculating, by the computer system, a load current needed by the one or more other electronic circuits to perform the one or more functional behaviors; and
calculating, by the computer system, the discharge of the one or more batteries when providing the load current.

17. The non-transitory computer-readable medium of claim 13, wherein the PDN is implemented as a hierarchical power tree, and
wherein the simulating comprises:
comparing different branches of the hierarchical power tree to determine which of the different branches is characterized as having a longest discharge time.

18. The non-transitory computer-readable medium of claim 13, wherein the operations further comprise:
adjusting, by the computer system, the electronic architectural design or the electronic design specification when the simulated discharge of the one or more batteries does not satisfy the electronic design specification.

19. The method of claim 1, wherein the simulating comprises:
simulating the discharge of the one or more batteries in relation to a battery discharge rate, regulator efficiency, and/or one or more usage scenarios for the electronic device.

20. The computer system of claim 7, wherein the instructions, which when executed by the processor, configure the processor to simulate the discharge of the one or more batteries in relation to a battery discharge rate, regulator efficiency, and/or one or more usage scenarios for the electronic device.

* * * * *